United States Patent
Rahmouni et al.

(10) Patent No.: US 12,192,427 B2
(45) Date of Patent: *Jan. 7, 2025

(54) IMAGE CAPTURE DEVICE FOR GENERATING TIME-LAPSE VIDEOS

(71) Applicant: GoPro, Inc., San Mateo, CA (US)

(72) Inventors: Nicolas Rahmouni, Paris (FR); Maxim Karpushin, Paris (FR); Thomas Derbanne, Paris (FR)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/395,185

(22) Filed: Dec. 22, 2023

(65) Prior Publication Data

US 2024/0129418 A1    Apr. 18, 2024

Related U.S. Application Data

(63) Continuation of application No. 17/988,556, filed on Nov. 16, 2022, now Pat. No. 11,856,171, which is a continuation of application No. 17/449,523, filed on Sep. 30, 2021, now Pat. No. 11,553,103, which is a continuation of application No. 17/032,346, filed on Sep. 25, 2020, now Pat. No. 11,140,292.

(60) Provisional application No. 62/908,031, filed on Sep. 30, 2019.

(51) Int. Cl.
*H04N 1/21* (2006.01)
*H04N 23/61* (2023.01)
*H04N 23/62* (2023.01)
*H04N 23/63* (2023.01)

(52) U.S. Cl.
CPC ........... *H04N 1/2133* (2013.01); *H04N 23/61* (2023.01); *H04N 23/62* (2023.01); *H04N 23/631* (2023.01)

(58) Field of Classification Search
CPC ...... H04N 1/2133; H04N 23/62; H04N 23/63; H04N 23/633; H04N 23/65; H04N 23/651; H04N 23/667
See application file for complete search history.

(56) References Cited

U.S. PATENT DOCUMENTS

| | | | |
|---|---|---|---|
| 10,924,671 B2 | 2/2021 | Yanai | |
| 11,140,292 B1 | 10/2021 | Rahmouni | |
| 11,553,103 B2 | 1/2023 | Rahmouni | |
| 11,856,171 B2 * | 12/2023 | Rahmouni | ........... H04N 23/611 |
| 2003/0146981 A1 | 8/2003 | Bean | |
| 2011/0115947 A1 | 5/2011 | Oh | |
| 2012/0050332 A1 | 3/2012 | Nikara | |
| 2016/0094801 A1 | 3/2016 | Beysserie | |
| 2017/0180589 A1 | 6/2017 | Guo | |
| 2023/0071855 A1 | 3/2023 | Rahmouni | |

* cited by examiner

*Primary Examiner* — Daniel M Pasiewicz
(74) *Attorney, Agent, or Firm* — ESPLIN & ASSOCIATES, PC

(57) ABSTRACT

An image capture device continuously generates time-lapse video frames to be included within a time-lapse video using a dynamic time-lapse video frame rate, with the value of the dynamic time-lapse video frame rate changing based on activation of a trigger to change the dynamic time-lapse video frame rate. The dynamic time-lapse video frame rate alternates between different values.

20 Claims, 8 Drawing Sheets

IMAGE CAPTURE DEVICE FOR GENERATING TIME-LAPSE VIDEOS

FIELD

This disclosure relates to generating time-lapse videos using dynamic time-lapse video frame rate.

BACKGROUND

A time-lapse video may provide a sped-up view of captured images. Using a single sped-up rate in generating the time-lapse video may result in a part of the video being sped up too much or too little.

SUMMARY

This disclosure relates to generating time-lapse videos. Time-lapse video frames may be generated based on a time-lapse video frame rate and/or other information. The time-lapse video frame rate may define a rate at which the time-lapse video frames are generated based on visual content captured by one or more image sensors. The time-lapse video frame rate may have a first value defining a first rate at which the time-lapse video frames are generated. Activation of a trigger to change the time-lapse video frame rate may be detected during generation of the time-lapse video frames. Responsive to the activation of the trigger, the time-lapse video frame rate may be changed to a second value defining a second rate different from the first rate without interruption of the generation of the time-lapse video frames. The generation of the time-lapse video frames based on the time-lapse video frame rate may be continued such that the time-lapse video frames include a first set of time-lapse video frames generated based on the first rate, a second set of time-lapse video frames generated based on the second rate, and/or other time-lapse video frames.

A system that generates time-lapse videos may include one or more electronic storages, one or more processors, and/or other components. An electronic storage may store visual information, information relating to visual content, information relating to generation of time-lapse video frames, information relating to time-lapse video frame rate, information relating to change in time-lapse video frame rate, information relating to one or more triggers to change the time-lapse video frame rate, information relating to activation of the trigger(s), information relating to detection of the activation of the trigger(s), and/or other information. In some implementations, the system may include one or more optical elements, one or more image sensors, one or more sound sensors, one or more touchscreen displays, one or more buttons, one or more position sensors, and/or other components.

One or more components of the system may be carried by a housing, such as a housing of an image capture device. For example, the optical element(s), the image sensor(s), the sound sensor(s), the touchscreen display(s), the button(s), and/or the position sensor(s) of the system may be carried by the housing of an image capture device. The housing may carry other components, such as the processor(s) and/or the electronic storage.

The processor(s) may be configured by machine-readable instructions. Executing the machine-readable instructions may cause the processor(s) to facilitate generating time-lapse videos. The machine-readable instructions may include one or more computer program components. The computer program components may include one or more of a generation component, a trigger component, a change component, and/or other computer program components.

The generation component may be configured to generate time-lapse video frames based on a time-lapse video frame rate and/or other information. The time-lapse video frame rate may define a rate at which the time-lapse video frames are generated based on visual content captured by one or more image sensors. The time-lapse video frame rate may have a first value defining a first rate at which the time-lapse video frames are generated. The time-lapse video frame rate may change during the generation of the time-lapse video frames. For example, the time-lapse video frame rate may be changed from the first value to a second value defining a second rate different from the first rate. The generation of the time-lapse video frames based on the time-lapse video rate may be continued after the change in the value of the time-lapse video frame rate such that the time-lapse video frames include a first set of time-lapse video frames generated based on the first rate, a second set of time-lapse video frames generated based on the second rate, and/or other time-lapse video frames.

The trigger component may be configured to detect activation of one or more triggers to change the time-lapse video frame rate during generation of the time-lapse video frames. In some implementations, one or more triggers to change the time-lapse video frame rate may be activated based one or more voice commands, one or more motion of an image capture device, one or more analyses of content (e.g., visual content, audio content) captured by an image capture device, and/or other information. In some implementations, one or more triggers to change the time-lapse video frame rate may be activated based on user interaction with one or more physical buttons and/or one or more touchscreen displays of an image capture device.

In some implementations, user interaction with a touchscreen display may include tapping on the touchscreen display. The tapping on the touchscreen display may cause the time-lapse video frame rate to switch between different values (e.g., between the first value and the second value).

In some implementations, user interaction with a touchscreen display may include holding a finger on the touchscreen display. Release of the finger from the touchscreen display may cause the time-lapse video frame rate to revert to a prior value (e.g., revert from the second value to the first value).

In some implementations, user interaction with a touchscreen display may include moving a finger along the touchscreen display. The difference between the value of the time-lapse video frame rate before and after the change in the time-lapse video frame rate (e.g., difference between the first value and the second value) may be determined based on an amount of movement of the finger along the touchscreen display, a direction of movement of the finger along the touchscreen display, a speed of movement of the finger along the touchscreen display, and/or other information.

The change component may be configured to, responsive to activation of one or more triggers, change the value of the time-lapse video frame rate. For example, responsive to activation of a trigger, the time-lapse video frame rate may be changed from a first value to a second value defining a second rate at which the time-lapse video frames are generated. The second rate may be different from the first rate. The time-lapse video frame rate may be changed without interruption of the generation of the time-lapse video frames.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
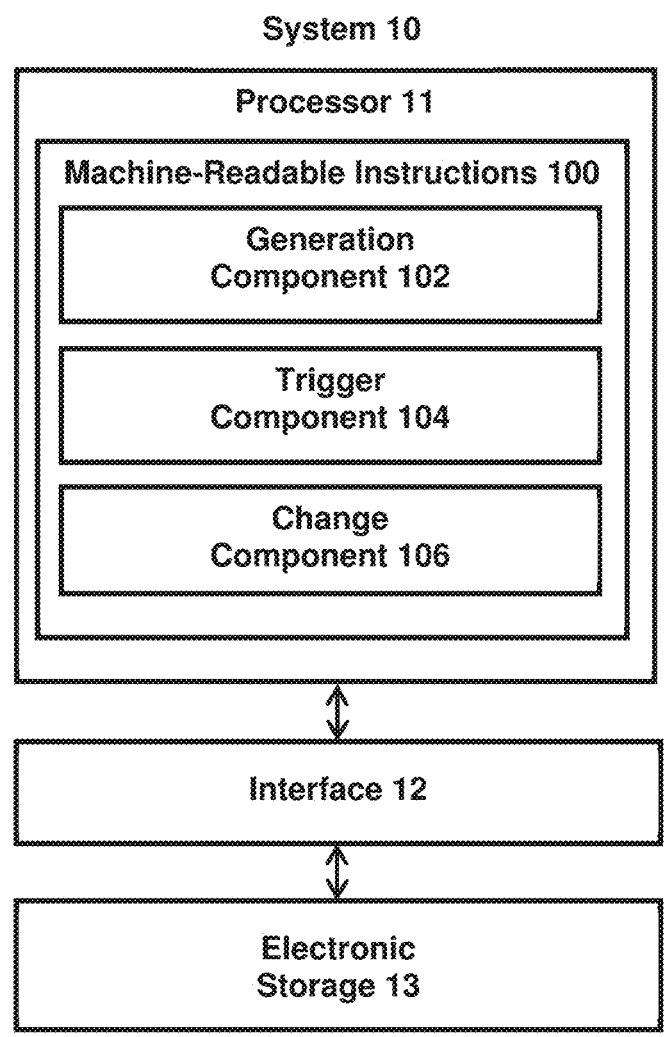
FIG. 1 illustrates an example system that generates time-lapse videos.

FIG. 1 illustrates a system 10 for generating time-lapse videos. The system 10 may include one or more of a processor 11, an interface 12 (e.g., bus, wireless interface), an electronic storage 13, and/or other components. In some implementations, the system 10 may include one or more optical elements, one or more image sensors, one or more sound sensors, one or more touchscreen displays, one or more buttons, one or more position sensors, and/or other components. Time-lapse video frames may be generated by the processor 11 based on a time-lapse video frame rate and/or other information. The time-lapse video frame rate may define a rate at which the time-lapse video frames are generated based on visual content captured by one or more image sensors. The time-lapse video frame rate may have a first value defining a first rate at which the time-lapse video frames are generated. Activation of a trigger to change the time-lapse video frame rate may be detected by the processor 11 during generation of the time-lapse video frames. Responsive to the activation of the trigger, the time-lapse video frame rate may be changed by the processor 11 to a second value defining a second rate different from the first rate without interruption of the generation of the time-lapse video frames. The generation of the time-lapse video frames based on the time-lapse video frame rate may be continued such that the time-lapse video frames include a first set of time-lapse video frames generated based on the first rate, a second set of time-lapse video frames generated based on the second rate, and/or other time-lapse video frames.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store visual information, information relating to visual content, information relating to generation of time-lapse video frames, information relating to time-lapse video frame rate, information relating to change in time-lapse video frame rate, information relating to one or more triggers to change the time-lapse video frame rate, information relating to activation of the trigger(s), information relating to detection of the activation of the trigger(s), and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate generating time-lapse videos. The machine-readable instructions 100 may include one or more computer program components. The machine-readable instructions 100 may include one or more of a generation component 102, a trigger component 104, a change component 106, and/or other computer program components.

Content of one or more videos may be referred to as video content. Video content may have a progress length. That is, a video may include video content having a progress length. A progress length may be defined in terms of time durations and/or frame numbers. For example, video content of a video may have a time duration of 60 seconds. Video content of a video may have 1800 video frames. Video content having 1800 video frames may have a play time duration of 60 seconds when viewed at 30 frames per second. Other progress lengths, time durations, and frame numbers are contemplated.

Video content may include visual content, audio content, and/or other content. For example, video content may include visual content viewable as a function of progress through the progress length of the video content, audio content playable as a function of progress through the progress length of the video content, and/or other content that may be played back as a function of progress through the progress length of the video content.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files.

Audio content may refer to media content that may be consumed as one or more sounds. Audio content may include one or more sounds stored in one or more formats/containers, and/or other audio content. Audio content may include one or more sounds captured by one or more sound sensors (e.g., microphone). Audio content may include audio/sound captured during the capture of the visual content and/or audio/sound provided as an accompaniment for the visual content. Audio content may include one or more of voices, activities, songs, music, and/or other audio/sounds. Audio content may include sounds captured by a single sound sensor or an array of sound sensors. The audio content may be captured by one or more sound sensors of the image capture device (e.g., microphone(s) of and/or coupled to the image capture device) and/or may be captured by one or more sound sensors separate from the image capture device (e.g., microphone(s) separate from the image capture device).

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, optical element(s), image sensor(s), sound sensor(s), touchscreen display(s), button(s), and/or position sensor(s) of the system 10 may be carried by the housing of the image capture device. The housing may carry other components, such as the processor 11 and/or the electronic storage 13. References to a housing of an image capture device may refer to the image capture device, and vice versa. For example, references to position/motion of a housing of an image capture device may refer to position/motion of the image capture device, and vice versa.

Figure 3:
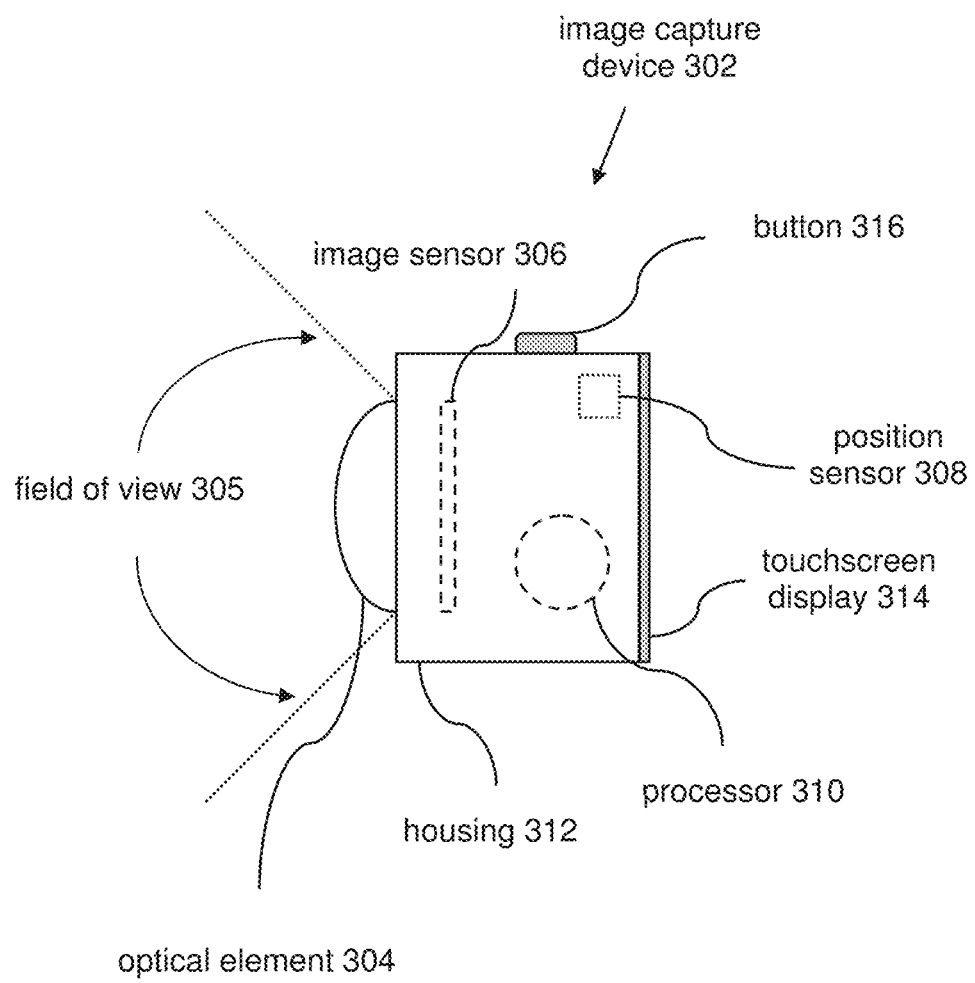
FIG. 3 illustrates an example image capture device.

An image capture device may refer to a device for recording visual information in the form of images, videos, and/or other media. An image capture device may be a standalone device (e.g., camera) or may be part of another device (e.g., part of a smartphone, tablet). FIG. 3 illustrates an example image capture device 302. The image capture device 302 may include a housing 312, and the housing 312 may carry (be attached to, support, hold, and/or otherwise carry) one or more of an optical element 304, an image sensor 306, a position sensor 308, a processor 310, a touchscreen display 314, a button 316, and/or other components. The image capture device 302 may include other components not shown in FIG. 3, such as a sound sensor. The image capture device 302 may not include one or more components shown in FIG. 3, such as the touchscreen display 314 or the button 316. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306. The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than or equal to 180-degrees. In some implementations, the field of view 305 may be smaller than or equal to 180-degrees. In some implementations, the image capture device 302 may include multiple optical elements, with the optical elements arranged to capture spherical view around the image capture device 302.

The field of view 305 may be larger than a size of the punchout/viewing window used to generate time-lapse video frames. For example, a punchout/viewing window within the visual content may be used to stabilize visual content captured by the image capture device 302 and the stabilized visual content may be included within the time-lapse video frames. Stabilization of visual content may include reduction, removal, and/or smoothing of motion present in the visual content due to motion (e.g., mechanical displacement, rotational motion, translational motion) of the image capture device 302 during visual content capture. Motion of the image capture device 302 during visual content capture may result in motion within the captured visual content. For example, shaking of the image capture device 302 during visual content capture may result in shaky motion within the captured visual content. Such motion within the visual content may be unintentional and/or not be desirable. Such motion may become more pronounced in time-lapse videos due to increase in perceived playback speed of the time-lapse videos.

Portions of the visual content captured from light within the field of view 305 may be presented on a display and/or used to generate time-lapse video frames. The portions of the visual content presented on the display/used to generate time-lapse video frames may include those portions of the visual content within a viewing window. A viewing window may define extents of the visual content (e.g., of image(s)/video frame(s)) to be included within a punchout. The viewing window may be determined so that the visual content within the presentation/time-lapse video frames do not include, include less motion, or include smoother motion than the visual content. For instance, the visual content may include shaky/jerky footage due to motion of the image capture device 302 during visual content capture, and the viewing window may be determined so that the portion of the visual content that is presented/used for time-lapse video frame generation does not appear shaky/jerky or appears less shaky/jerky. For example, the shape, size, and/or the location of the viewing window within the visual content may be determined to compensate for motion of the image capture device 302 during capture such that the time-lapse video frames appear to have been captured from an image capture device 302 with less/smoother motion. That is, the visual content captured by the image capture device 302 may be cropped to generate time-lapse video frames that are stabilized.

The image sensor 306 may include sensor(s) that converts received light into output signals. The output signals may include electrical signals. For example, the image sensor 306 may include one or more of a charge-coupled device sensor, an active pixel sensor, a complementary metal-oxide semiconductor sensor, an N-type metal-oxide-semiconductor sensor, and/or other image sensors. The image sensor 306 may generate output signals conveying information that defines visual content of one or more images and/or one or more video frames of a video. For example, the image sensor 306 may be configured to generate a visual output signal based on light that becomes incident thereon during a capture duration. The visual output signal may convey visual information that defines visual content having the field of view.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

Capture of visual content by the image sensor 306 may include conversion of light received by the image sensor 306 into output signals/visual information defining visual content. Capturing visual content may include recording, storing, and/or otherwise capturing the visual content for use in generating video content (e.g., content of video frames). For example, during a capture duration, the visual output signal generated by the image sensor 306 and/or the visual information conveyed by the visual output signal may be used to record, store, and/or otherwise capture the visual content for use in generating video content.

A sound sensor may include sensor(s) (e.g., microphone, component(s) of microphone) that converts received sounds into output signals. The output signals may include electrical signals. The sound sensor may generate output signals conveying information based on the received sounds. For example, sound sensor may be configured to generate a sound output signal conveying audio information based on the received sounds. The audio information may define audio content. The audio content may include one or more reproductions of the received sounds. The audio information may define audio content in one or more formats, such as WAV, MP3, MP4, RAW, and/or other formats.

The position sensor 308 may include sensor(s) that measures experienced positions and/or motions. The position sensor 308 may convert experienced positions and/or motions into output signals. The output signals may include electrical signals. For example, the position sensor 308 may refer to a set of position sensors, which may include one or more inertial measurement units, one or more accelerometers, one or more gyroscopes, and/or other position sensors.

The position sensor 308 may generate output signals conveying information that characterizes positions and/or motions of the position sensor 308 and/or device(s) carrying the position sensor 308, such as the image capture device 302 and/or the housing 312.

For example, the position sensor 308 may be configured to generate a position output signal based on positions of the image capture device 302 during the capture duration. The position output signal may convey position information that characterizes positions of the image capture device 302 at different moments (points in time, time durations) within the capture duration. The position information may characterize positions of the image capture device 302 based on specific translational and/or rotational positions of the image capture device 302 and/or based on changes in translational and/or rotational positions of the image capture device 302 as a function of progress through the capture duration. That is, the position information may characterize translational and/or rotational positions of the image capture device 302 and/or changes in translational and/or rotational positions (motion) of the image capture device 302 (e.g., direction, amount, velocity, acceleration) during the capture duration. The position information may include rotational position information characterizing rotational position of the image capture device 302, translational position information characterizing translational position of the image capture device 302, and/or other position information.

The position information may be determined based on signals generated by the position sensor 308 and independent of the information/signals generated by the image sensor 306. That is, position information may be determined without using visual content/images/videos generated by the image sensor 306. Use of visual content/images/videos to determine positions/motions of the image capture device 302 may be computationally expensive in terms of processing power, processing time, and/or battery consumption. Using the information/signals from the position sensor 308 to determine positions/motions of image capture device 302 may be computationally cheaper. That is, less processing power, processing time, and/or battery consumption may be required when positions/motions of the image capture device 302 are determined from the information/signals from the position sensor 308 than the information/signals from the image sensor 306. The position information determined independent of the image information may be used to determine the positions/motions of the image capture device 302 during the capture duration.

In some implementations, the position information may include data from the position sensor (e.g., gyroscope data, accelerometer data) with time stamps per visual content capture at different moments. For example, the position may include gyroscope data and/or accelerometer data per individual video frames captured by the image capture device. In some implementations, calibration of an inertial measurement unit may be used to combine different data within the position information.

The processor 310 may include one or more processors (logic circuitry) that provide information processing capabilities in the image capture device 302. The processor 310 may provide one or more computing functions for the image capture device 302. The processor 310 may operate/send command signals to one or more components of the image capture device 302 to operate the image capture device 302. For example, the processor 310 may facilitate operation of the image capture device 302 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 310 may obtain information from the image sensor 306 and/or the position sensor 308, and/or facilitate transfer of information from the image sensor 306 and/or the position sensor 308 to another device/component. The processor 310 may be remote from the processor 11 or local to the processor 11. One or more portions of the processor 310 may be part of the processor 11 and/or one or more portions of the processor 10 may be part of the processor 310. The processor 310 may include and/or perform one or more functionalities of the processor 11 shown in FIG. 1.

The touchscreen display 314 may be configured to present visual content (e.g., visual content captured by the image capture device 302, graphical user interface). The touchscreen display 314 may be configured to receive user input during the presentation of the video content. The touchscreen display 314 may be configured to generate output signals indicating location of user interaction (e.g., a user's engagement) with the touchscreen display 314. User interaction with the touchscreen display 314 may be received/determined based on the touchscreen output signals. The touchscreen display 314 may be interacted upon by a user to provide one or more commands to the image capture device 302. For example, a user may interact with the touchscreen display 314 to provide one or more commands to the image capture device 302 to change the rate at which time-lapse video frames are generated by the image capture device 302.

The touchscreen display 314 may include one or more touch-sensitive screens and/or other components. A user may interact with the touchscreen display 314 by touching one or more portions of a touch-sensitive screen (e.g., with one or more fingers, stylus). A user may interact with the touchscreen display 314 at a moment in time, at multiple moments in time, during a period, and/or during multiple periods. A user may tap on or move along the touchscreen display 314. For example, a user may tap on one or more portions of the touchscreen display 314 (e.g., any portion of the touchscreen display 314, a portion of the touchscreen display 314 corresponding to an element of the graphical user interface presented on the touchscreen display 314, a portion of the touchscreen display 314 corresponding to an option to change time-lapse video frame rate) to interact (e.g., engage, toggle, manipulate) with the touchscreen display 314. A user may make a moving motion (e.g., holding one or more fingers on the touchscreen display 314 and moving the finger(s) in one or more particular directions) to interact with the touchscreen display 314.

The button 316 may refer to one or more mechanisms that may be physically interacted upon by a user. The button 316 may be interacted upon by a user to operate the button 316 and provide one or more commands to the image capture device 302. For example, a user may interact with the button 316 to provide one or more commands to the image capture device 302 to change the rate at which time-lapse video frames are generated by the image capture device 302. User interaction with the button 316 may include one or more of pressing the button 316, pulling the button 316, twisting the button 316, flipping the button 316, and/or other interaction with the button 316.

Referring back to FIG. 1, the processor 11 (or one or more components of the processor 11) may be configured to obtain information to facilitate stabilizing videos. Obtaining information may include one or more of accessing, acquiring, analyzing, determining, examining, identifying, loading, locating, opening, receiving, retrieving, reviewing, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor, a position sensor) and/or one or more software components (e.g., software running on a computing device).

The generation component 102 may be configured to generate time-lapse video frames based on a time-lapse video frame rate and/or other information. A time-lapse video frame may refer to a video frame to be included within a time-lapse video. The time-lapse video frame rate may define a rate at which the time-lapse video frames are generated based on visual content captured by one or more image sensors (e.g., the image sensor 306). The generation component 102 may generate time-lapse video frames based on visual content captured by image sensor(s) at moments in accordance with the time-lapse video frame rate. The time-lapse video frame rate may be used to determine, based on moment of capture, which visual content will be included in the time-lapse video as time-lapse video frames. The time-lapse video frames may be generated as one or more of an image frame, frame of pixels, encoded frame (e.g., I-frame, P-frame, B-frame), and/or other video frames. For example, individual time-lapse video frames may be generated as I-frames (intra-coded images including complete images).

In some implementations, the encoding of the time-lapse video frames may be determined based on amount of changes in the content of adjacent time-lapse video frames. For example, based on the amount of changes in the content of adjacent time-lapse video frames exceeding a threshold, the time-lapse video frames may be encoded as I-frames. Based on the amount of changes in the content of adjacent time-lapse video frames not exceeding a threshold, one or more of the time-lapse video frames may be encoded as P-frame(s) (predicted image(s) including/using changes from preceding time-lapse video frame) and/or B-frame(s) (bidirectional predicted image(s) including/using changes from both preceding and following time-lapse video frame).

In some implementations, the encoding of the time-lapse video frames may be determined based on the time-lapse video frame rate. Faster time-lapse video frame rate may generally lead to generation of adjacent time-lapse video frames with less difference in content than slower time-lapse video frame rate. The time-lapse video frame rate may be used in place of content analysis to determine whether the time-lapse video frames will be generated as one or more of I-frames, P-frames, B-frames, and/or other frames. Other encoding and generation of time-lapse video frames are contemplated.

The time-lapse video frame rate may have a value defining a rate at which the time-lapse video frames are generated. For example, the value of the time-lapse video frame rate may define how many time-lapse video frames are generated per a duration of time (e.g., number of time-lapse video frames per second/minute/hour). The value of the time-lapse video frame rate may be the same as the number of time-lapse video frames to be generated per a duration of time. The value of the time-lapse video frame rate be used to determine how many time-lapse video frames are generated per a duration of time. For example, the value of the time-lapse video frame rate may be the value of the perceived-playback speed (e.g., 30×) to be achieved within the time-lapse video, and the number of time-lapse video frames to be generated per a duration of time may be determined based on the perceived-playback speed. Other types of values of the time-lapse video frame rate are contemplated.

The time-lapse video frame rate may be different from the playback rate of a video (how many video frames are presented per a duration of time). The time-lapse video frame rate may be lower than the video playback rate. For example, video frames may be generated at a time-lapse video frame rate of 1 video frame per second while the generated video frames (included in a video) may be played at video playback rate of 30 video frames per second. Such a difference in the time-lapse video frame rate and the video playback rate may make the video to appear to be played with a 30× increase in speed (perceived-playback speed of 30×). Other time-lapse video frame rate and video playback rate are contemplated.

The value (e.g., initial value) of the time-lapse video frame rate may be set based on user input, system default, and/or other information. For example, a user input may define a particular value of the time-lapse video frame rate to be used in generating time-lapse video frames. The image capture device may operate with a default value for the time-lapse video frame rate, which may be changed by a user. Other setting of the value of the time-lapse video frame rate are contemplated.

In some implementations, the value (e.g., initial value) of the time-lapse video frame rate may be set based on an environment in which the visual content is captured by the image capture device and/or other information. The environment may refer to the surroundings, conditions, and/or physical area in which the visual content is captured by the image capture device. Different values of time-lapse video frame rate may be appropriate for different environments of visual content capture. For example, a perceived-playback speed of 8× in time-lapse video may be too fast for indoor visual content and may be too slow for outdoor visual content capture. For instance, same amount of translational movement indoor and outdoor may result in different changes in the observed surrounding of the image capture device.

For example, forward movement of ten feet indoor may result in large change in the observed surrounding of the image capture device while forward movement of ten feet outdoor may result in small change in the observed surrounding of the image capture device. Different changes in the observed surrounding of the image capture device in different environment may be due to different proximity of the environment to the image capture device, with things close to the image capture device resulting in greater changes in observed surrounding of the image capture device and things farther away from the image capture device resulting in smaller changes in the observed surrounding of the image capture device for same amount of image capture device movement. Thus, the environment in which the visual content is captured may be used to determine the initial value of the time-lapse video frame rate (e.g., faster value for indoor, smaller value for outdoor). For example, the time-lapse video frame rate may be set for indoor capture to generate a time-lapse video with a perceived-playback speed of 5× and may be set for outdoor capture to generate a time-lapse video with a perceived-playback speed of 10×. Other time-lapse video frame rates are contemplated.

In some implementations, the environment in which the visual content is captured by the image capture device may be determined based on one or more of an exposure, a white balance, and/or a scene classification of the visual content captured by the image capture device. Such determination of the environment may be used to determine the time-lapse video frame rate in place of environment depth measurement. That is, rather than determining how far/close things are located in relation to the image capture device in the environment, the exposure, the white balance, and/or the scene classification may be used as a substitute in determining how far things are likely located in relation to the image capture device.

In some implementations, generation of the time-lapse video frames based on the time-lapse video frame rate may include selection of the time-lapse video frames from images/portions of images captured by the image capture device based on the time-lapse video frame rate and/or other information. For example, the image capture device may capture images at a certain capture rate, and the time-lapse video frame rate may be used to select some or all of the captured images for inclusion as time-lapse video frames in a time-lapse video. That is, the time-lapse video frame rate may be used to select which of the video frames included within a video will be used as time-lapse video frames of a time-lapse video.

In some implementations, generation of the time-lapse video frames based on the time-lapse video frame rate may include capture of the time-lapse video frames by the image capture device based on the time-lapse video frame rate and/or other information. That is, the rate at which the image capture device captures images (e.g., sampling rate) may be set based on (e.g., same as, multiple of) the time-lapse video frame rate. Setting of the capture rate of the image capture device based on the time-lapse video frame rate may enable the image capture device to minimize/reduce the number of images that are captured to generate a time-lapse video. Such capture of images may enable the image capture device to conserve resources (e.g., battery, processing power, memory) when capturing time-lapse videos.

In some implementations, one or more of the time-lapse video frames may be stabilized based on a punchout of the time-lapse video frame(s). Rather than using the entire visual content of the time-lapse video frames, one or more portions of the time-lapse video frames may be punched out (using a viewing window) to provide stabilization of the visual content within the time-lapse video frames. Stabilization of visual content may be performed based on placement of the viewing window within the field of view of the visual content. Stabilization of visual content may include using smaller spatial extents of the visual content to provide a punchout view of the visual content that creates a more stable view than when viewing the entirety of the visual content.

A punchout of the visual content may refer to an output of one or more portions of the visual content for presentation (e.g., current presentation, future presentation based on video generated using the punchout). A punchout of the visual content may refer to extents of the visual content that is obtained for viewing and/or extraction. The extents of the visual content viewable/extracted within the viewing window may be used to provide views of different spatial extents of the visual content. Inclusion of the extent(s) of the visual content within the punchout/viewing window may effectuate stabilization of the visual content via selective cropping.

The placement of the viewing window may compensate for the motion (e.g., unintentional motion) of the image capture device during the capture duration. The placement of the viewing window may reduce, remove, and/or smooth the motion present in the visual content due to different translational and/or rotational positions of the image capture device when it captured the visual content. For example, a viewing window having a smaller size than the field of view of the visual content may be used to provide a punchout of the visual content. The punchout (cropped view) may be moved within the field of view to provide a stabilized view of the visual content.

The viewing window may be oriented with respect to the field of view of the visual content to provide a punchout of the visual content that is stable/smooth with respect to prior and/or next punchout of the visual content. For example, the viewing window may be oriented with respect to the field of view of images captured by the image capture device to provide a punchout of the images such that the visual content within the viewing window appears to have been captured with a stable/more stable image capture device (e.g., a punchout of a video frame being stable/more stable with a punchout of the preceding video frame and/or a subsequent video frame).

The time-lapse video frames generated by the generation component 102 may be defined by time-lapse video information. Time-lapse video information defining time-lapse video frames may define an encoded version/copy of the time-lapse video frames/time-lapse video and/or instructions for rendering the time-lapse video frames/time-lapse video. For example, the time-lapse video information may define an encoded version/copy of the time-lapse video frames/time-lapse video, and the time-lapse video information (e.g., time-lapse video file) may be opened in a video player for presentation of the time-lapse video frames/time-lapse video. The time-lapse video information may define instructions to render the time-lapse video frames/time-lapse video for presentation. For example, the time-lapse video information may define a director track that includes information as to which images and/or which visual portions of the images should be included within a presentation as time-lapse video frames/time-lapse video. A video player may use the director track to retrieve the relevant images/relative visual portions of the images when the time-lapse video is opened/to be presented.

The generation component 102 may be configured effectuate storage of the time-lapse video information and/or other information in one or more storage media. For example, the time-lapse video information may be stored in the electronic storage 13, remote storage locations (storage media located at/accessible through a server), and/or other locations. In some implementations, the generation component 102 may effectuate storage of the time-lapse video information through one or more intermediary devices. For example, the processor 11 may be located within a computing device without a connection to the storage device (e.g., the computing device lacks Wi-Fi/cellular connection to the storage device). The generation component 102 may effectuate storage of the time-lapse video information through another device that has the necessary connection (e.g., the computing device using a Wi-Fi/cellular connection of a paired mobile device, such as a smartphone, tablet, laptop, to store information in one or more storage media). Other storage locations for and storage of the time-lapse video information are contemplated.

The time-lapse video frame rate may change during the generation of the time-lapse video frames. For example, the time-lapse video frame rate may be changed from one value to a different value defining a rate at which the time-lapse video frames are generated. The generation of the time-lapse video frames based on the time-lapse video rate may be continued after the change in the value of the time-lapse video frame rate such that the time-lapse video frames include one set of time-lapse video frames (including one or more time-lapse video frames) generated based on the rate before the change, another set of time-lapse video frames including one or more time-lapse video frames) generated based on the changed rate, and/or other time-lapse video frames.

The time-lapse video frame rate may be changed without interrupting the generation of the time-lapse video frames. For example, the image capture device may be used to record a time-lapse video. The time-lapse video frame rate may be dynamic during the recording of the time-lapse video and change to provide different sped-up views of the captured content. Different segments of the time-lapse video may be generated at different rates so that content captured at different times are played back with different perceived playback speeds (e.g., 1×, 10×, 30×). The recording of the time-lapse video may not be interrupted by the change in time-lapse video frame rate. For example, recording of a time-lapse video with perceived playback speed of 10× may not need to be stopped to start recording a time-lapse video with perceived playback speed of 30×. Rather, recording of the time-lapse video may transition from perceived playback speed of 10× to 30× without interruption in the recording. Rather than having a time-lapse video with a single perceived playback speed (e.g., 10×), use of the dynamic time-lapse video frame rate may enable generation of a time-lapse video with perceived playback speeds that changes within the time-lapse video.

The trigger component 104 may be configured to detect activation of one or more triggers to change the time-lapse video frame rate during generation of the time-lapse video frames. A trigger may refer to a thing, an event, a situation, and/or a condition that initiates a change in time-lapse video frame rate. A trigger may refer to one or more hardware components of the image capture device, one or more software components of the image capture device, one or more particular ways in which the image capture device is being used, and/or other thing(s), event(s), situation(s), and/or condition(s).

Activation of a trigger may refer to action or process of making the trigger active or operative. Activation of a trigger may refer to occurrence and/or usage of the trigger. Activation of a trigger may refer to one or more of usage of a thing, occurrence of an event, occurrence of a situation, and/or occurrence of a condition. For example, activation of a trigger may include one or more of usage of hardware component(s) of the image capture device, usage of software component(s) of the image capture device, occurrence in which the image capture device is being used in particular way(s), and/or usage of other thing(s)/occurrence of other event(s)/situation(s)/condition(s). Activation of a trigger may provide one or more commands to the image capture device to change the time-lapse video frame rate and/or other information relating to change in the time-lapse video frame rate.

Activation of a trigger may be detected based on monitoring of the trigger. Activation of a trigger may be detected based on monitoring of the usage of the trigger and/or occurrence of the trigger. For example, activation of a trigger may be detected based on monitoring of one or more of usage of a thing, occurrence of an event, occurrence of a situation, and/or occurrence of a condition. Monitoring of a trigger may be performed based on observation and/or checking of information that characterizes usage and/or occurrence of the trigger. Activation of a trigger may be detected based on provision of one or more commands to the image capture device to change the time-lapse video frame rate and/or other information relating to change in the time-lapse video frame rate. Other triggers, activations of triggers, and detection of activations of triggers are contemplated.

In some implementations, one or more triggers to change the time-lapse video frame rate may be activated based one or more voice commands, one or more motion of an image capture device, one or more analyses of content (e.g., visual content, audio content) captured by an image capture device, and/or other information. A voice command may refer to one or more words, phrases, sounds, and/or other audible commands that is associated with change in time-lapse video frame rate. A voice command may be recorded and/or detected by one or more sound sensors, such as a sound sensor of the image capture device. A voice command may cause change in the time-lapse video frame rate by increasing or decrease the value of the time-lapse video frame rate. In some implementations, a voice command may include information on the amount and/or direction (increase, decrease) of the change in the value of the time-lapse video frame rate. In some implementations, a voice command may cause change in the time-lapse video frame rate between set values (e.g., cycling between slow rate and fast rate, cycling between progressively faster/slower rates, jumping between different rates). In some implementations, different voice commands (different words/phrase/sounds) may be associated with different types of change in the time-lapse video frame rate.

Motion of an image capture device may refer to translational movement of the image capture device, rotational movement of the image capture device, direction of movement of the image capture device, speed of the image capture device, acceleration of the image capture device, and/or other movement of the image capture device. Particular motion of the image capture device may cause change in the time-lapse video frame rate by increasing or decrease the value of the time-lapse video frame rate. In some implementations, particular motion of the image capture device may cause change in the time-lapse video frame rate between set values (e.g., cycling between slow rate and fast rate, cycling between progressively faster/slower rates, jumping between different rates). In some implementations, different motion of the image capture device may be associated with different types of change in the time-lapse video frame rate. For instance, particular speed, acceleration, stopping, falling, and/or jump of the image capture device/subject holding the image capture device may cause different changes in the time-lapse video frame rate and/or cause the time-lapse video frame rate to change to particular values associated with the particular motion.

For example, the time-lapse video frame rate may change based on detection of particular motion of the image capture device. For instance, the time-lapse video frame rate may be increased to generate time-lapse video frames at a higher frequency when image capture device motion of interest is detected (e.g., falling, jumping). The time-lapse video frame rate may be decreased to generate time-lapse video frames at a lower frequency when image capture device motion of no/less interest is detected (e.g., still image capture device, steady motion)

As another example, the time-lapse video frame rate may be changed based on the amount and/or type of motion of the image capture device. For example, detection of fast motion of the image capture device may result in the time-lapse video frame rate that is higher than based on detection of slow motion of the image capture device. Time-lapse video frame rate may be adjusted based on the speed of the motion of the image capture device so that more time-lapse video frames are generated for fast motion than slow motion. As another example, detection of a particular type of motion (e.g., jumping, falling) may result in the time-lapse video frame rate changing to a predefined time-lapse video frame rate corresponding to the particular type of motion. The time-lapse video frame rate may be adjusted in accordance with the predefined time-lapse video frame rate so that different types of motion of the image capture device are captured using the corresponding/associated time-lapse video frame rate.

Analysis of content captured by an image capture device may include analysis of visual content, audio content, and/or other content captured by the image capture device. Analysis of visual content may include examination of one or more visual features/characteristics of the visual content. In some implementations, analysis of visual content may include detection of content within the visual content. Visual content detection may include identification of things within the visual content (e.g., face recognition, object recognition, scene recognition, emotion recognition), the quality and/or number of things within the visual content (e.g., number of faces, number of objects, level of emotion, amount of motion), and/or other features/characteristics relating to things depicted within the visual content. Analysis of audio content may include examination of one or more audio features/characteristics of the audio content. In some implementations, analysis of audio content may include detection of content within the audio content. Audio content detection may include identification of particular audio within the audio content (e.g., voice command, sound), the quality of audio within the visual content (e.g., energy, clarity), and/or other features/characteristics relating to audio captured within the audio content.

For example, the time-lapse video frame rate may change based on detection of particular objects (e.g., persons, faces), and/or detection of motion within the visual content. For instance, the time-lapse video frame rate may be increased to generate time-lapse video frames at a higher frequency when person and/or faces are detected. The time-lapse video frame rate may be decreased to generate time-lapse video frames at a lower frequency when visual content of no/less interest is detected (e.g., still scene, steady change in scene).

As another example, the time-lapse video frame rate may be changed based on the amount and/or type of motion detected within the visual content. For example, detection of fast motion in the visual content may result in the time-lapse video frame rate that is higher than based on detection of slow motion in the visual content. Time-lapse video frame rate may be adjusted based on the speed of the motion detected within the visual content so that more time-lapse video frames are generated for fast motion than slow motion. As another example, detection of a particular type of motion (e.g., jumping, falling, interacting with a device) may result in the time-lapse video frame rate changing to a predefined time-lapse video frame rate corresponding to the particular type of motion. The time-lapse video frame rate may be adjusted in accordance with the predefined time-lapse video frame rate so that different types of motion are captured using the corresponding/associated time-lapse video frame rate.

In some implementations, one or more triggers to change the time-lapse video frame rate may be activated based on detection/occurrence of one or more highlight moments. A highlight moment may refer to a moment at which a highlight event occurs. A highlight event may refer to an exciting, interesting, and/or an important event, such as a high point or a climax of an activity being performed by one or more users. A highlight event may be an event of interest. A highlight event/moment may be detected based on analysis of the visual content (e.g., blur detection, color analysis, face recognition, histogram analysis, object recognition, activity recognition, scene recognition, salience detection, emotion recognition), analysis of the audio content (e.g., voice recognition, command recognition, activity recognition, emotion detection), analysis of user input (e.g., a user interacting with a highlight button), analysis of metadata relating to the visual content/audio content (e.g., telemetry data, GPS data, IMU data, speed data, velocity data, acceleration data, rotation data), and/or other information. In some implementations, metadata may be stored in a separate metadata track of the content container (e.g., mp4 container including visual content, and/or audio content).

Examples of metadata may include: telemetry data (such as motion data, velocity data, and acceleration data) captured by sensor(s) on the image capture device; location information captured by a GPS receiver of the image capture device; compass heading information; altitude information of the image capture device; biometric data such as the heart rate of the user, breathing of the user, eye movement of the user, body movement of the user; vehicle data such as the velocity or acceleration of the vehicle carrying the image capture device; the brake pressure of the vehicle, or the rotations per minute (RPM) of the vehicle engine; and/or environment data such as the weather information associated with the capture of the video.

For example, a highlight event/moment may include events of interest within the captured video, captured scenes associated with certain metadata (such as an above threshold altitude or speed), captured scenes associated with certain image capture device and/or environment characteristics, and/or other content. In some implementations, the metadata may be captured by the image capture device during capture of the video and/or may be retrieved from one or more other metadata sources (e.g., after capture of the video). In some implementations, metadata associated with the video may be used to identify highlight events/moments without relying on image processing techniques or manual highlight detection by a user.

In some implementations, metadata may include information about the video/the capture of the video, the content of the video, the image capture device used to capture the video, the environment or setting in which the video is captured, and/or other information associated with the capture of the video. For example, metadata may include acceleration data representative of the acceleration of an image capture device carried by a user as the user captures a video while snowboarding down a mountain. Such acceleration metadata may facilitate identification of highlight events/moments including a sudden change in acceleration during the capture of the video. Sudden changes in acceleration during the capture of the video may indicate that the user has performed a jump or crashed. Motion data associated with a high altitude, a mountain location, and a parabolic upward and then downward velocity may be identified as a "snowboarding jump" while motion data associated with a low altitude, a water location, and a parabolic upward and then downward velocity may be identified as a "surfing jump." A sudden slowdown in velocity and accompanying negative acceleration may be identified as a "crash". Identification of other events/moments are contemplated.

One or more criteria may be used to identify highlight events/moments. Example criteria for identifying highlight events/moments may include: a greater than threshold change in acceleration or velocity within a pre-determined period of time, a maximum or above-threshold velocity or acceleration, a maximum or local maximum altitude, a maximum or above-threshold heart rate or breathing rate of a user, a maximum or above-threshold audio magnitude, a capture location being within a predetermined threshold distance from a pre-determined location, a threshold change in or pre-determined orientation of the image capture device, a proximity to another image capture device or location, a capture time within a threshold of a pre-determined time, a pre-determined environmental condition (such as a particular weather event, a particular temperature, a sporting event, a human gathering, or any other suitable event. Other criteria for identifying highlight events/moments are contemplated.

In some implementations, highlight events/moments may be identified based on an interest curve. An interest curve may characterize different levels of interesting things captured within the video at different moments based on values of the interest curve. In some implementations, highlight events/moments may be identified based on the shape of the interest curve. Using shape of the interest curve to determine highlight moments may facilitate identification of moments of different qualities in terms of values of the interest curve. For example, highlight events/moments may be identified to at a local maximum, a global maximum, a local minimum, and/or a global minimum of the interest curve. As another example, highlight events/moments may be identified at portions of the interest curve that have values higher/lower than a threshold hold. As another example, highlight events/moments may be identified at leveled portions of the interest curve—portions of the interest curve that maintains a certain range of interest values over a certain range of time.

In some embodiments, highlight events/moments may be identified based on a reverse of identification of non-highlight events/moments. Analysis of the visual content, analysis of the audio content, analysis of user, analysis of metadata relating to the visual content/audio content, and/or other information may be used to identify when highlight events/moments do not occur. For example, capture of video associated with a below-threshold movement, a below-threshold luminosity, a lack of faces or other recognizable objects within the visual content, audio content that does not include dialogue or other notable sound effects may be used to identify non-highlight events/moments. The inverse of the non-highlight events/moments portions may be identified as including or potentially including highlight events/moments.

In some implementations, other information may be used to detect occurrences of events of interest. For example, location of the image capture device, motion of the image capture device, and/or other metadata/telemetry associated with the image capture device may be used to detect occurrences of events of interest. Detection of occurrences of events of interest may be used to determine/change time-lapse video frame rate.

In some implementations, one or more triggers to change the time-lapse video frame rate may be activated based on user interaction with one or more buttons. A button may be interacted upon by a user to provide one or more commands to the image capture device to change the time-lapse video frame rate. User interaction with a button may include one or more of pressing the button, pulling the button, twisting the button, flipping the button, and/or other interaction with the button. How the user interacts with a button may determine how the time-lapse video frame rate changes (e.g., increases, decreases, amount of increase/decrease, switch/cycle between set values).

A button may include a physical button, a virtual button, and/or other types of button. A physical button (hard button) may refer to a physical component of the image capture device (e.g., button 316) that may be interacted upon by a user. A virtual button (soft button) may refer to a virtual component of the image capture device (e.g., presented on the touchscreen display 314) that may be interacted upon by a user.

A button may include a button with a function dedicated to changing the time-lapse video frame rate. A button may include a multi-function button with one or more of its functions dedicated to changing the time-lapse video frame rate. A button may include a variable function button with its operative function changing based on user selection, image capture mode operation, and/or other information. The operative function of the button may include changing the time-lapse video frame rate.

In some implementations, one or more triggers to change the time-lapse video frame rate may be activated based on user interaction with one or more touchscreen displays of an image capture device. For example, a trigger to change the time-lapse video frame rate may be activated based on user interaction with the touchscreen display 314.

In some implementations, user interaction with a touchscreen display may include tapping on the touchscreen display. A user tapping on the touchscreen display may include using one or more fingers and/or one or more tools (e.g., stylus) to momentarily touch the touchscreen display. In some implementation, a user may tap on any portion of the touchscreen display to active the trigger(s) to change the time-lapse video frame rate. In some implementations, a user may be required to tap on one or more specific portions of the touchscreen display to active the trigger(s) to change the time-lapse video frame rate.

The tapping on the touchscreen display may cause the time-lapse video frame rate to switch between different values. For example, tapping on the touchscreen display may cause the value of the time-lapse video frame rate to increase—change from its present value to a higher value to generate more time-lapse video frame rate during a time duration. As another example, tapping on the touchscreen display may cause the value of the time-lapse video frame rate to decrease—change from its present value to a lower value to generate fewer time-lapse video frame rate during a time duration.

In some implementations, individual tapping of the touchscreen display may cause the time-lapse video frame rate to alternate between the value before the tapping and a set value. For example, an initial tapping of the touchscreen display may cause the value of the time-lapse video frame rate to change from its present value to a lower/higher value. A subsequent tapping of the touchscreen display may cause the value of the time-lapse video frame rate to change from the lower/higher value back (revert) to the original value before the initial tapping. Multiple tapping of the touchscreen display may cause the value of the time-lapse video frame rate to alternate between two values.

In some implementations, individual tapping of the touchscreen display may cause the time-lapse video frame rate to cycle through different values. The values may be ordered from lowest value to highest value, or from highest value to lowest value. Other orderings of values are contemplated. For example, an initial tapping of the touchscreen display may cause the value of the time-lapse video frame rate to change from its present value to lower/higher value. A subsequent tapping of the touchscreen display may cause the value of the time-lapse video frame rate to change to a lower/higher value. Multiple tapping of the touchscreen display may cause the value of the time-lapse video frame rate to decrease/increase by one or more amounts (e.g., equal amounts, different amounts).

In some implementations, different numbers of fingers may be associated with different values of time-lapse video frame rates, and tapping different number of fingers on the touchscreen displays at the same time may cause the time-lapse video frame rate to change to different values. For example, tapping one finger on the touchscreen display may cause the time-lapse video frame rate to change to a value associated with one finger, and tapping two fingers on the touchscreen display may cause the time-lapse video frame rate to change to a value associated with two fingers. Usage of other numbers of fingers are contemplated.

In some implementations, user interaction with a touchscreen display may include holding one or more fingers and/or one or more tools on the touchscreen display. In some implementation, a user may tap and hold on any portion of the touchscreen display to active the trigger(s) to change the time-lapse video frame rate. In some implementations, a user may be required to tap and hold on one or more specific portions of the touchscreen display to active the trigger(s) to change the time-lapse video frame rate.

The tapping and holding on the touchscreen display may cause the time-lapse video frame rate to switch between different values. For example, tapping and holding on the touchscreen display may cause the value of the time-lapse video frame rate to increase—change from its present value to a higher value to generate more time-lapse video frame rate during a time duration. As another example, tapping and holding on the touchscreen display may cause the value of the time-lapse video frame rate to decrease—change from its present value to a lower value to generate fewer time-lapse video frame rate during a time duration.

In some implementations, release of the finger from the touchscreen display may cause the time-lapse video frame rate to revert to a prior value (e.g., revert from the changed value to the original value). Tapping-holding and releasing may cause the time-lapse video frame rate to alternate between the value before the tapping-holding and a set value. For example, tapping and holding on the touchscreen display may cause the value of the time-lapse video frame rate to change from its present value to a lower/higher value. Release from the touchscreen display may cause the value of the time-lapse video frame rate to change In some implementations, individual tapping-holding of the touchscreen display may cause the time-lapse video frame rate to cycle through different values. The values may be ordered from lowest value to highest value, or from highest value to lowest value. Other orderings of values are contemplated. For example, an initial tapping-holding of the touchscreen display may cause the value of the time-lapse video frame rate to change from its present value to lower/higher value. A subsequent tapping-holding of the touchscreen display may cause the value of the time-lapse video frame rate to change to a lower/higher value. Multiple tapping-holding of the touchscreen display may cause the value of the time-lapse video frame rate to decrease/increase by one or more amounts (e.g., equal amounts, different amounts).

In some implementations, different numbers of fingers may be associated with different values of time-lapse video frame rates, and tapping-holding different number of fingers on the touchscreen displays at the same time may cause the time-lapse video frame rate to change to different values. For example, tapping-holding one finger on the touchscreen display may cause the time-lapse video frame rate to change to a value associated with one finger, and tapping-holding two fingers on the touchscreen display may cause the time-lapse video frame rate to change to a value associated with two fingers. Usage of other numbers of fingers are contemplated.

In some implementations, user interaction with a touchscreen display may include moving one or more fingers and/or one or more tools along the touchscreen display. Moving a finger/tool along the touchscreen display may include placing a tip of the finger/tool on the touchscreen display and dragging the tip in one or more directions along the touchscreen display. The direction of the movement along the touchscreen display may determine whether the time-lapse video frame rate increases or decreases (direction of change in time-lapse video frame rate). For example, moving the finger/tool in a right/up direction along the touchscreen display may cause the time-lapse video frame rate to increase while moving the finger/tool in a left/down direction along the touchscreen display may cause the time-lapse video frame rate to decrease, or vice versa. Other directions of movement to control direction of change in time-lapse video frame rate are contemplated.

In some implementations, the extent and/or direction to which the value of the time-lapse video frame rate changes may depend on how the user interacted with the touchscreen display. For example, the difference between the value of the time-lapse video frame rate before and after the change in the time-lapse video frame rate (e.g., difference between the original value and the changed value) may be determined based on one or more of an amount of movement of the finger/tool along the touchscreen display, a direction of movement of the finger/tool along the touchscreen display, a speed of movement of the finger/tool along the touchscreen display, and/or other information.

Figure 4A:
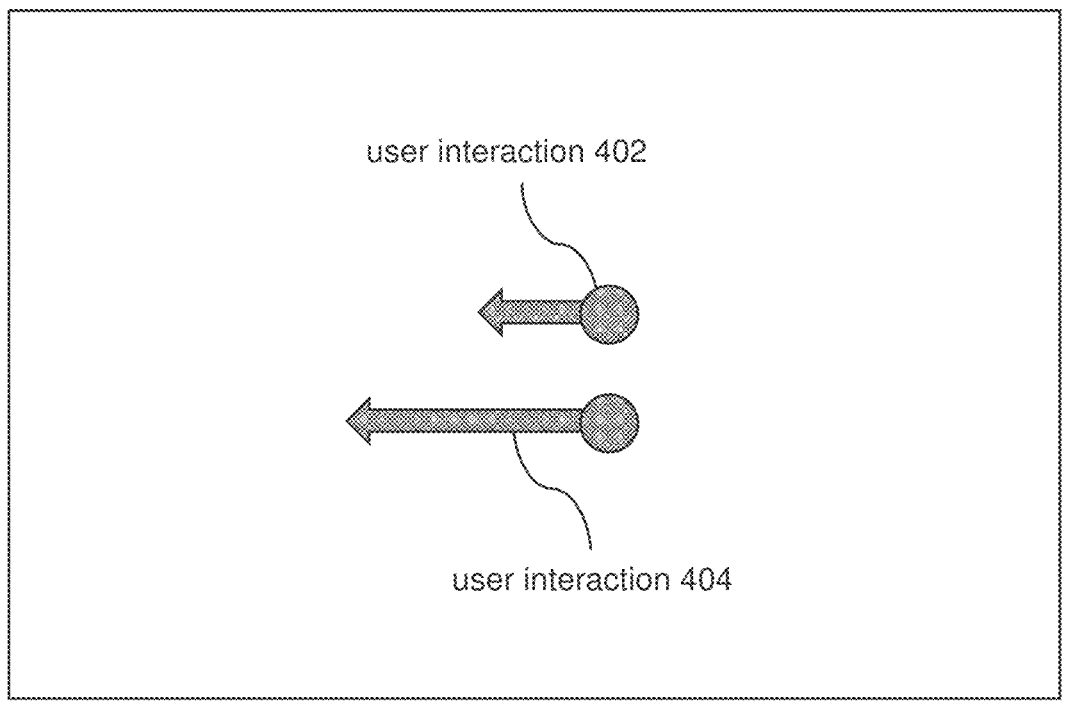
FIGS. 4A, 4B, 4C and 4D illustrate example user interaction with a touchscreen display of an image capture device.

For example, FIGS. 4A, 4B, 4C and 4D illustrate example user interaction with a touchscreen display of an image capture device. In FIG. 4A, user interactions with a touchscreen display 400 may include a user interaction 402 and a user interactions 404. The user interactions 402, 404 may include a user placing a finger/tool on the touchscreen 400 display and moving the finger/tool to the left along the touchscreen display 400. The amount of movement in the user interaction 402 may be smaller than the amount of movement in the user interaction 404. The value of the time-lapse video frame rate may be changed more after the user interaction 404 than the user interaction 402 based on the larger movement in the user interaction 404.

Figure 4B:
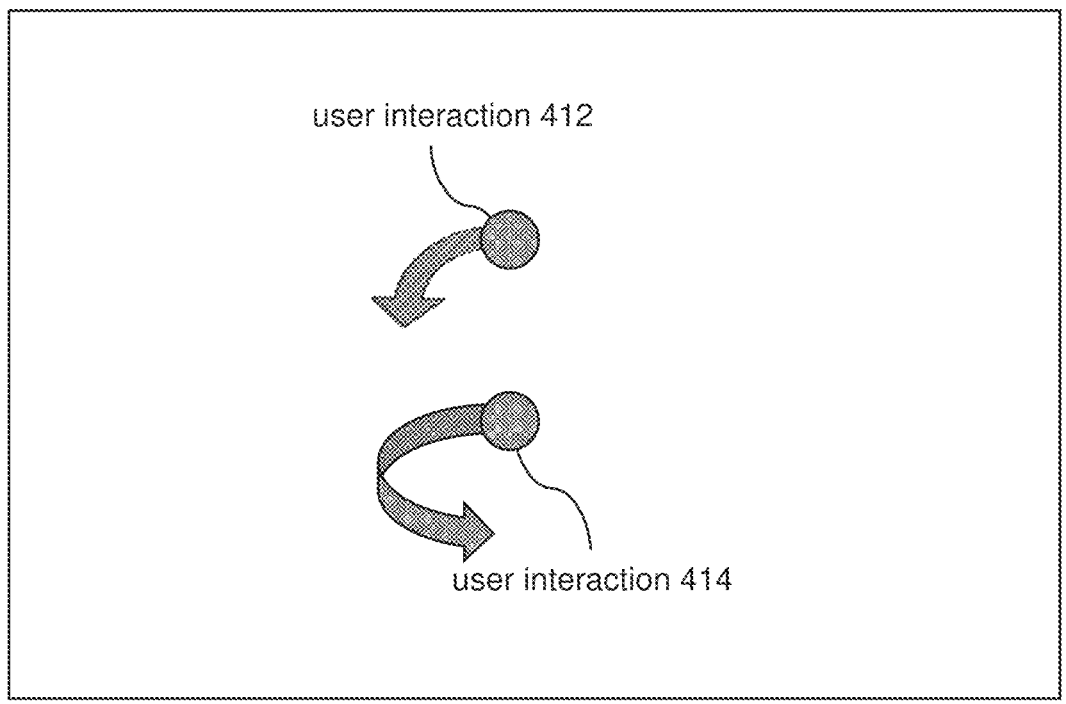

In FIG. 4B, user interactions with a touchscreen display 410 may include a user interaction 412 and a user interactions 414. The user interactions 412, 414 may include a user placing a finger/tool on the touchscreen 410 display and moving the finger/tool in a counter-clockwise direction along the touchscreen display 410. The amount of movement in the user interaction 412 may be smaller than the amount of movement in the user interaction 414. The value of the time-lapse video frame rate may be changed more responsive to the user interaction 414 than the user interaction 412 based on the larger movement in the user interaction 414.

Figure 4C:
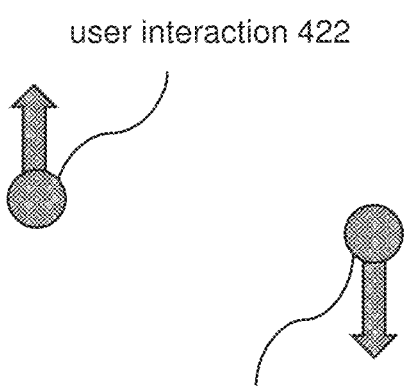

In FIG. 4C, user interactions with a touchscreen display 420 may include a user interaction 422 and a user interactions 424. The user interactions 422 may include a user placing a finger/tool on the touchscreen 420 display and moving the finger/tool in an upward direction along the touchscreen display 420. The user interactions 424 may include a user placing a finger/tool on the touchscreen 420 display and moving the finger/tool in a downward direction along the touchscreen display 420. The value of the time-lapse video frame may be increased responsive to the user interaction 422 and the value of the time-laps video frame may be decreased responsive to the user interaction 424, or vice versa.

As another example, different directions of movement on the touchscreen display 420 may be associated with different values of time-lapse video frame rates, and the value of the time-lapse video frame rate may be changed to different values based on different directions of user interactions. For example, upward direction of movement on the touchscreen display 420 may be associated with higher value of time-lapse video frame rate than downward direction of movement on the touchscreen display 420. The value of the time-lapse video frame may be changed to the higher value responsive to the user interaction 422 and the value of the time-lapse video frame may be changed to the lower value responsive to the user interaction 424.

Figure 4D:
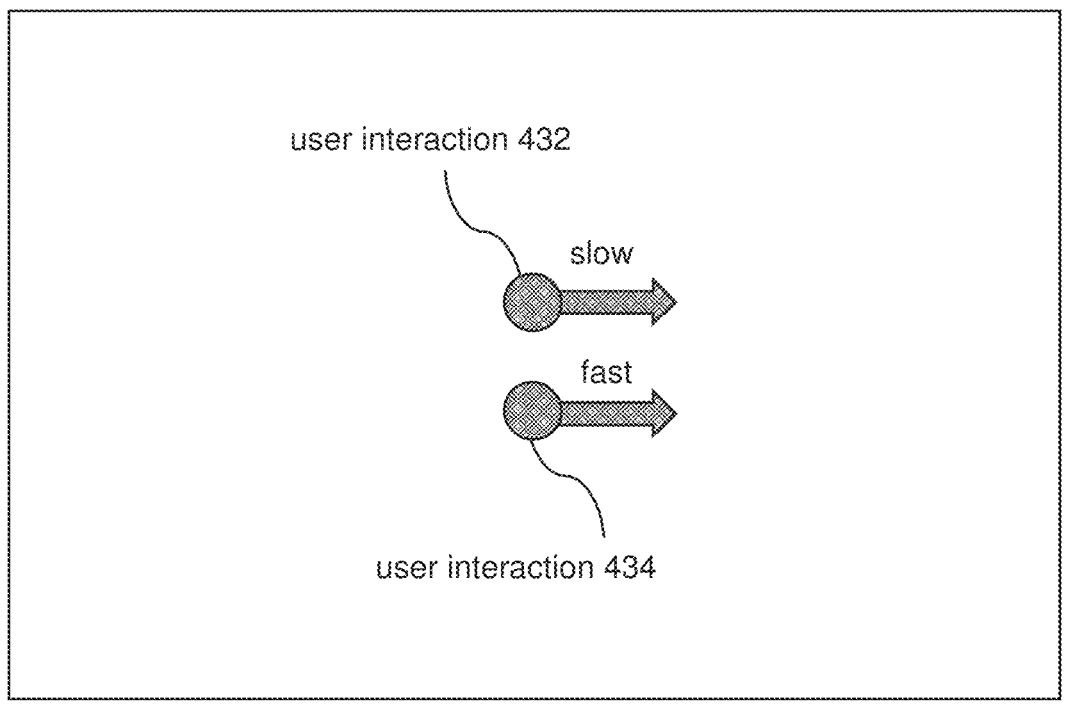

In FIG. 4D, user interactions with a touchscreen display 430 may include a user interaction 432 and a user interactions 434. The user interactions 432, 434 may include a user placing a finger/tool on the touchscreen 430 display and moving the finger/tool to the right along the touchscreen display 430. The speed of movement in the user interaction 432 may be slower than the speed of movement in the user interaction 434. The value of the time-lapse video frame rate may be changed more responsive to the user interaction 434 than the user interaction 432 based on the faster movement in the user interaction 434. Other user interactions with the touchscreen display to change the time-lapse video frame rate are contemplated.

The change component 106 may be configured to, responsive to activation of one or more triggers, change the value of the time-lapse video frame rate. For example, responsive to activation of a trigger, the time-lapse video frame rate may be changed from one value to another value defining a different rate at which the time-lapse video frames are generated. The time-lapse video frame rate may be changed without interruption of the generation of the time-lapse video frames. The time-lapse video frames rate may be changed without stopping the generation of the time-lapse video frames. For example, change in the time-lapse video frame rate may include recording of a time-lapse video where the time-lapse video frame rate transitions from one rate to different rate so that the footage in the time-lapse video includes a segments with one perceived playback speed and another segment with a different perceived playback speed.

Changing the time-lapse video frame rate may include increasing or decreasing the time-lapse video frame rate. In some implementations, the time-lapse video frame rate may be changed linearly and/or non-linearly. For example, the rate at which the time-lapse video frame rate changes may stay the same or may be different through the change. The change in the time-lapse video frame rate may be symmetrical or non-symmetrical. For example, the time-lapse video frame rate may be increased and decreased at the same rate or at different rates (e.g., decrease in time-lapse video frame rate happens more quickly than increase in time-lapse video frame rate, or vice versa).

The direction (increase, decrease) and/or amount (difference in value) of change in the time-lapse video frame rate may be determined based on the activated trigger(s), user interaction with the image capture device, and/or other information. For example, the direction and/or amount of change in the time-lapse video frame rate may be determined based on or more voice commands, one or more motion of an image capture device, one or more analyses of content (e.g., visual content, audio content) captured by an image capture device, one or more highlight events/moments, user interaction with one or more buttons, user interaction with one or more touchscreen displays of an image capture device, and/or other information. For instance, the time-lapse video frame rate may be changed in a particular direction and/or by certain amount based on the particular voice command(s) used by the user, particular motion of the image capture device, particular visual content captured by the image capture device, particular audio content captured by the image capture device, occurrence of particular highlight events/moments, particular user interaction with the button(s), particular user interactions with the touchscreen display(s), and/or other information. Other changes in the time-lapse video frame rate are contemplated.

In some implementations, the time-lapse video frame rate may be increased to be the same as the video playback rate (e.g., make the video appear to be played with a 1× speed) and/or may be increased above the video playback rate (e.g., make the video appear to be played with a 0.5× speed).

In some implementations, change in the time-lapse video frame rate may be applied to moments preceding the activation of the trigger or the detection of the activation of the trigger. The extent (length, duration of time) to which the change in the time-lapse video frame is applied to moments preceding the activation/detection may be determined based on user input, system default, type of trigger activated, and/or other information. In some implementations, one or more of the time-lapse video frames may be generated based on interpolation of other images (e.g., other time-lapse video frames, images stored in a buffer).

For change in time-lapse video frame rate that decreases the time-lapse video frame rate, one or more of the time-lapse video frames generated before the activation of the trigger may be removed from inclusion in the time-lapse video. Such removal of the time-lapse video frames may effectuate backward application of decreased time-lapse video frame rate to already generated time-lapse video frames.

For change in time-lapse video frame rate that increases the time-lapse video frame rate, the time-lapse video frames may be generated from visual content stored in one or more buffers. The visual content may be captured at a rate faster than the time-lapse video frame rate. The visual content may be stored in a buffer for a duration. To apply a faster time-lapse video frame rate to moments before the activation of the trigger, some or all of the visual content stored in the buffer may be used to generate the time-lapse video frame rates. The visual content stored in the buffer may be used to generate time-lapse video frames that were not generated based on time-lapse video frame rate before the activation of the trigger. The visual content sored in the buffer may be used to generate time-lapse video frames in accordance with the increased time-lapse video frame rate.

Figure 5:
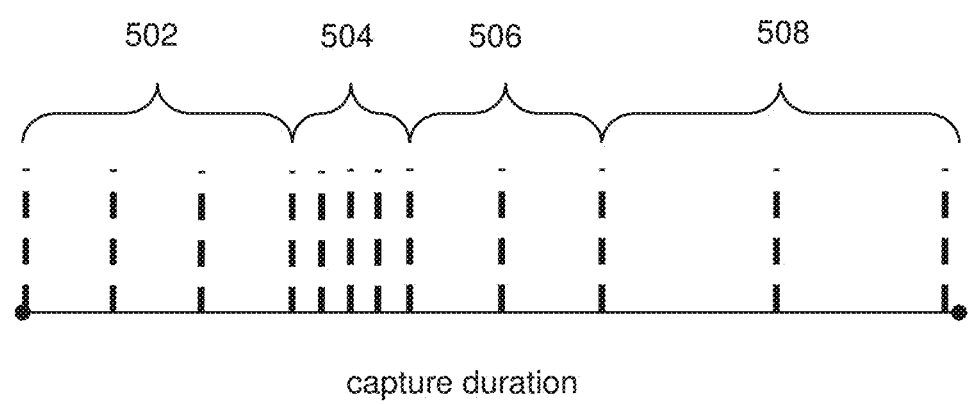
FIG. 5 illustrates example generation of time-lapse video frames based on a dynamic time-lapse video frame rate.

FIG. 5 illustrates example generation of time-lapse video frames based on a dynamic time-lapse video frame rate. FIG. 5 illustrates twelve time-lapse video frames generated during a capture duration. A dynamic time-lapse video frame rate may include a time-lapse video frame rate that changes during the generation of the time-lapse video frames. The dynamic time-lapse video frames may be used to generate a time-lapse video with different perceived playback speeds within different segments of the time-lapse video. For example, for a portion 502 of the capture duration, the value of the time-lapse video frame rate may be set so that the time-lapse video frames are generated for at a particular rate. For a portion 504 of the capture duration, the value of the time-lapse video frame rate may be increased so that the time-lapse video frames are generated at a faster rate. For a portion 506 of the capture duration, the value of the time-lapse video frame rate may be reverted to the value used to generate time-lapse video frames for the portion 402. For a portion 508, the value of the time-lapse video frame rate may be decreased so that the time-lapse video frames are generated at a slower rate. Other changes in time-lapse video frame rates and other generations of time-lapse video frames are contemplated.

While the present disclosure is described with respect to changes in time-lapse video frame rate, the present disclosure may be applied to changes in other video frame rates. For example, the techniques described herein may be applied to change the video frame rate (capture video frame rate) used by an image capture device to capture/generate video frames. The video frame rate may have a value defining a rate at which the video frames are generated. Activation of a trigger to change the video frame rate may be detected during generation of the video frames. Responsive to the activation of the trigger, the video frame rate may be changed to a different value without interruption of the generation of the video frames. The generation of the video frames based on the video frame rate may be continued such that the video frames include a set of video frames generated based on original rate, a set of video frames generated based on the changed rate, and/or other video frames.

For example, an image capture device may begin capture/generation of video frames using a value of video frame rate to provide 1× perceived playback speed. The value of the video frame rate may be decreased to increase the perceived playback speed (e.g., to faster than 1× perceived playback speed). The value of the video frame rate may be increased to decrease the perceived playback speed (e.g., to slower than 1× perceived playback speed).

An image capture device may begin capture/generation of video frames using a value of video frame rate to provide less than 1× perceived playback speed (for slow motion video). The value of the video frame rate may be decreased to increase the perceived playback speed (e.g., to 1× perceived playback speed, to faster than 1× perceived playback speed). The value of the video frame rate may be increased to decrease the perceived playback speed (for slower motion video).

An image capture device may begin capture/generation of video frames using a value of video frame rate to provide faster than 1× perceived playback speed (for fast motion video). The value of the video frame rate may be decreased to increase the perceived playback speed (for faster motion video). The value of the video frame rate may be increased to decrease the perceived playback speed (e.g., to 1× perceived playback speed, to slower than 1× perceived playback speed). Other changes in video frame rate are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
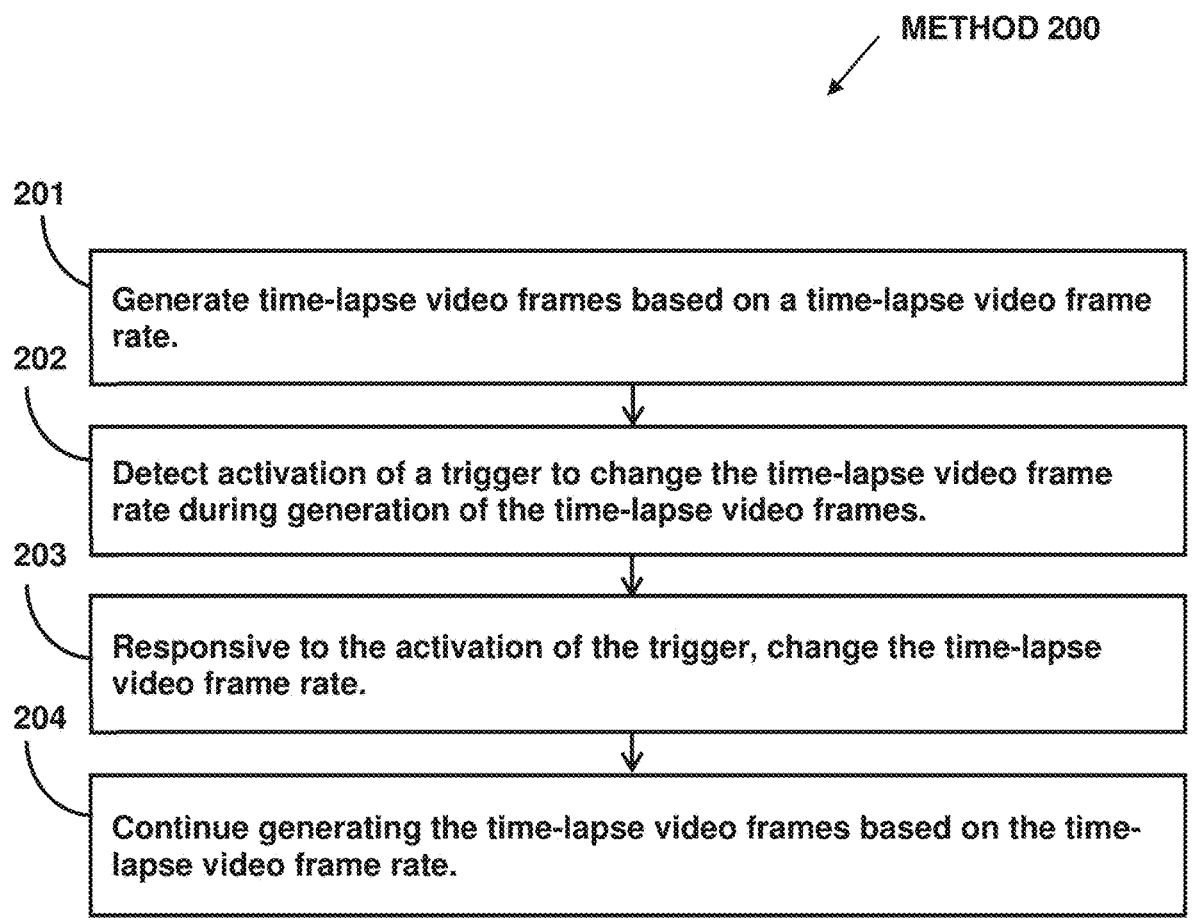
FIG. 2 illustrates an example method for generating time-lapse videos.

FIG. 2 illustrates method 200 for generating time-lapse videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, time-lapse video frames may be generated based on a time-lapse video frame rate and/or other information. The time-lapse video frame rate may define a rate at which the time-lapse video frames are generated based on visual content captured by one or more image sensors. The time-lapse video frame rate may have a first value defining a first rate at which the time-lapse video frames are generated. In some implementation, operation 201 may be performed by a processor component the same as or similar to the generation component 102 (Shown in FIG. 1 and described herein).

At operation 202, activation of a trigger to change the time-lapse video frame rate may be detected during generation of the time-lapse video frames. In some implementation, operation 202 may be performed by a processor component the same as or similar to the trigger component 104 (Shown in FIG. 1 and described herein).

At operation 203, responsive to the activation of the trigger, the time-lapse video frame rate may be changed to a second value defining a second rate different from the first rate without interruption of the generation of the time-lapse video frames. In some implementation, operation 203 may be performed by a processor component the same as or similar to the change component 106 (Shown in FIG. 1 and described herein).

At operation 204, the generation of the time-lapse video frames based on the time-lapse video rate may be continued such that the time-lapse video frames include a first set of time-lapse video frames generated based on the first rate, a second set of time-lapse video frames generated based on the second rate, and/or other time-lapse video frames. In some implementation, operation 204 may be performed by a processor component the same as or similar to the generation component 102 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for generating time-lapse video frames using a dynamic time-lapse video frame rate, the system comprising:

one or more physical processors configured by machine-readable instructions to:

store visual content captured by an image capture device in a buffer for use in generating the time-lapse video frames, the visual content captured based on a value of a capture frame rate;

generate the time-lapse video frames based on a first value of the dynamic time-lapse video frame rate, the dynamic time-lapse video frame rate defining a rate at which the time-lapse video frames are generated from the visual content stored in the buffer, the first value defining a first rate at which the time-lapse video frames are generated from the visual content stored in the buffer, the first value of the dynamic time-lapse video frame rate being different from the value of the capture frame rate;

detect activation of a trigger to change the dynamic time-lapse video frame rate during generation of the time-lapse video frames;

responsive to the activation of the trigger, change the dynamic time-lapse video frame rate in generating the time-lapse video frames from the first value to a second value defining a second rate different from the first rate, wherein responsive to the activation of the trigger, the dynamic time-lapse video frame rate alternates between the first value and the second value; and continue generating the time-lapse video frames from the visual content stored in the buffer based on the dynamic time-lapse video frame rate such that the time-lapse video frames include a first set of time-lapse video frames generated based on the first rate and a second set of time-lapse video frames generated based on the second rate.

2. The system of claim 1, wherein the activation of the trigger to change the dynamic time-lapse video frame rate is detected based on user interaction with a touchscreen display.

3. The system of claim 2, wherein the user interaction is required to be performed on a specific portion of the touchscreen display to change the dynamic time-lapse video frame rate.

4. The system of claim 2, wherein the user interaction is required to be performed on any portion of the touchscreen display to change the dynamic time-lapse video frame rate.

5. The system of claim 2, wherein the visual content captured by the image capture device is presented on the touchscreen display.

6. The system of claim 1, wherein the value of the capture frame rate results in the visual content being captured at a faster rate than the first rate at which the time-lapse video frames are generated from the visual content stored in the buffer.

7. The system of claim 6, wherein the first value of the dynamic time-lapse video frame rate results in the first set of time-lapse video frames having a perceived playback speed that is faster than a 1× perceived playback speed.

8. The system of claim 7, wherein the second value of the dynamic time-lapse video frame rate results in the second set of time-lapse video frames having the 1× perceived playback speed or a 0.5× perceived playback speed.

9. A method for generating time-lapse video frames using a dynamic time-lapse video frame rate, the method performed a computing system including one or more processors, the method comprising:

storing visual content captured by an image capture device in a buffer for use in generating the time-lapse video frames, the visual content captured based on a value of a capture frame rate;

generating the time-lapse video frames based on a first value of the dynamic time-lapse video frame rate, the dynamic time-lapse video frame rate defining a rate at which the time-lapse video frames are generated from the visual content stored in the buffer, the first value defining a first rate at which the time-lapse video frames are generated from the visual content stored in the buffer, the first value of the dynamic time-lapse video frame rate being different from the value of the capture frame rate;

detecting activation of a trigger to change the dynamic time-lapse video frame rate during generation of the time-lapse video frames;

responsive to the activation of the trigger, changing the dynamic time-lapse video frame rate in generating the time-lapse video frames from the first value to a second value defining a second rate different from the first rate, wherein responsive to the activation of the trigger, the dynamic time-lapse video frame rate alternates between the first value and the second value; and continuing to generate the time-lapse video frames from the visual content stored in the buffer based on the dynamic time-lapse video frame rate such that the time-lapse video frames include a first set of time-lapse video frames generated based on the first rate and a second set of time-lapse video frames generated based on the second rate.

10. The method of claim 9, wherein the activation of the trigger to change the dynamic time-lapse video frame rate is detected based on user interaction with a touchscreen display.

11. The method of claim 10, wherein the user interaction is required to be performed on a specific portion of the touchscreen display to change the dynamic time-lapse video frame rate.

12. The method of claim 10, wherein the user interaction is required to be performed on any portion of the touchscreen display to change the dynamic time-lapse video frame rate.

13. The method of claim 10, wherein the visual content captured by the image capture device is presented on the touchscreen display.

14. The method of claim 9, wherein the value of the capture frame rate results in the visual content being captured at a faster rate than the first rate at which the time-lapse video frames are generated from the visual content stored in the buffer.

15. The method of claim 14, wherein the first value of the dynamic time-lapse video frame rate results in the first set of time-lapse video frames having a perceived playback speed that is faster than a 1× perceived playback speed.

16. The method of claim 15, wherein the second value of the dynamic time-lapse video frame rate results in the second set of time-lapse video frames having the 1× perceived playback speed or a 0.5× perceived playback speed.

17. A system for generating time-lapse video frames using a dynamic time-lapse video frame rate, the system comprising:
a touchscreen display; and
one or more physical processors configured by machine-readable instructions to:
store visual content captured by an image capture device in a buffer for use in generating the time-lapse video frames, the visual content captured based on a value of a capture frame rate;
present the visual content on the touchscreen display;
generate the time-lapse video frames based on a first value of the dynamic time-lapse video frame rate, the dynamic time-lapse video frame rate defining a rate at which the time-lapse video frames are generated from the visual content stored in the buffer, the first value defining a first rate at which the time-lapse video frames are generated from the visual content stored in the buffer, the first value of the dynamic time-lapse video frame rate being different from the value of the capture frame rate, the value of the capture frame rate resulting in the visual content being captured at a faster rate than the first rate at which the time-lapse video frames are generated from the visual content stored in the buffer;
detect activation of a trigger to change the dynamic time-lapse video frame rate during generation of the time-lapse video frames based on user interaction with the touchscreen display that is presenting the visual content;
responsive to the activation of the trigger, change the dynamic time-lapse video frame rate in generating the time-lapse video frames from the first value to a second value defining a second rate different from the first rate, wherein responsive to the activation of the trigger, the dynamic time-lapse video frame rate alternates between the first value and the second value; and
continue generating the time-lapse video frames from the visual content stored in the buffer based on the dynamic time-lapse video frame rate such that the time-lapse video frames include a first set of time-lapse video frames generated based on the first rate and a second set of time-lapse video frames generated based on the second rate.

18. The system of claim 17, wherein:
the first value of the dynamic time-lapse video frame rate results in the first set of time-lapse video frames having a perceived playback speed that is faster than a 1× perceived playback speed; and
the second value of the dynamic time-lapse video frame rate results in the second set of time-lapse video frames having the 1× perceived playback speed or a 0.5× perceived playback speed.

19. The system of claim 17, wherein the user interaction is required to be performed on a specific portion of the touchscreen display to change the dynamic time-lapse video frame rate.

20. The system of claim 17, wherein the user interaction is required to be performed on any portion of the touchscreen display to change the dynamic time-lapse video frame rate.

* * * * *